US008060237B2

(12) United States Patent
Franzen et al.

(10) Patent No.: US 8,060,237 B2
(45) Date of Patent: Nov. 15, 2011

(54) METHOD AND APPARATUS FOR WORK INSTRUCTION GENERATION

(75) Inventors: Steven E. Franzen, St. Charles, MO (US); Joseph Anelle, St. Charles, MO (US); Carl E. Bouffiou, Tacoma, WA (US); William J. Hlavacek, Seattle, WA (US); Max N. Jensen, Redmond, WA (US); David Q. Ledosquet, Kent, WA (US); Robert J. Schreiber, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 141 days.

(21) Appl. No.: 11/853,317

(22) Filed: Sep. 11, 2007

(65) Prior Publication Data
US 2009/0069920 A1 Mar. 12, 2009

(51) Int. Cl.
*G06F 19/00* (2011.01)
(52) U.S. Cl. .............. 700/182; 700/97; 700/98
(58) Field of Classification Search ............. 700/83, 700/86, 95, 97, 98, 100, 117, 118, 180, 182, 700/184; 703/1, 2, 6–8; 345/419–421
See application file for complete search history.

(56) References Cited

U.S. PATENT DOCUMENTS

| | | | | |
|---|---|---|---|---|
| 4,694,404 A | * | 9/1987 | Meagher | 345/421 |
| 5,115,400 A | * | 5/1992 | Watanabe et al. | 700/182 |
| 5,177,689 A | * | 1/1993 | Kinasi et al. | 700/184 |
| 5,293,321 A | * | 3/1994 | Fujita et al. | 700/182 |
| 5,552,995 A | * | 9/1996 | Sebastian | 700/97 |
| 5,757,649 A | * | 5/1998 | Kato | 700/182 |
| 5,761,068 A | * | 6/1998 | Nakata | 700/182 |
| 5,822,206 A | * | 10/1998 | Sebastian et al. | 700/97 |
| 6,169,993 B1 | * | 1/2001 | Shutt et al. | 707/103 R |
| 6,671,572 B1 | * | 12/2003 | Craft et al. | 700/184 |
| 6,772,038 B2 | * | 8/2004 | Kadono | 700/184 |
| 6,785,581 B2 | * | 8/2004 | Mountcastle et al. | 700/96 |
| 6,907,313 B2 | * | 6/2005 | Matthews et al. | 700/182 |
| 6,922,599 B2 | * | 7/2005 | Richey | 700/98 |
| 7,016,745 B1 | * | 3/2006 | Dickerson et al. | 700/182 |
| 7,058,472 B2 | * | 6/2006 | Mathews et al. | 700/182 |
| 7,062,342 B1 | * | 6/2006 | Feng et al. | 700/97 |
| 7,065,420 B1 | * | 6/2006 | Philpott et al. | 700/97 |
| 7,218,989 B2 | * | 5/2007 | Mukai et al. | 700/182 |
| 7,424,334 B2 | * | 9/2008 | Khurana et al. | 700/97 |
| 7,505,829 B2 | * | 3/2009 | Khetan et al. | 700/98 |
| 2005/0137740 A1 | * | 6/2005 | Lindstrom et al. | 700/182 |
| 2006/0100934 A1 | | 5/2006 | Burr et al. | |

(Continued)

FOREIGN PATENT DOCUMENTS

EP 1447760 A2 8/2004

(Continued)

OTHER PUBLICATIONS

U.S. Appl. No. 11/828,256, filed Jul. 25, 2007, Bouffio.

(Continued)

*Primary Examiner* — Charles Kasenge
(74) *Attorney, Agent, or Firm* — Yee & Associates, P.C.

(57) ABSTRACT

A computer implemented method, apparatus, and computer usable program code for manufacturing a product. In response to receiving an identification of the product, a process object associated with the product may be identified. A completed instance of the process object may be created for the product. A set of instructions may be presented to manufacture the product using the completed instance of the process object.

15 Claims, 5 Drawing Sheets

U.S. PATENT DOCUMENTS

2006/0129262 A1 6/2006 Zayic et al.
2006/0155418 A1* 7/2006 Bradbury et al. ............. 700/182

FOREIGN PATENT DOCUMENTS

WO 0011579 A1 3/2000
WO 2005022281 A2 3/2005

OTHER PUBLICATIONS

Gu et al., "Product modelling using STEP", Computer Aided Design, Elsevier Publishers BV, Barking, GB, vol. 27, No. 3, Mar. 1, 1995, pp. 163-179.

* cited by examiner

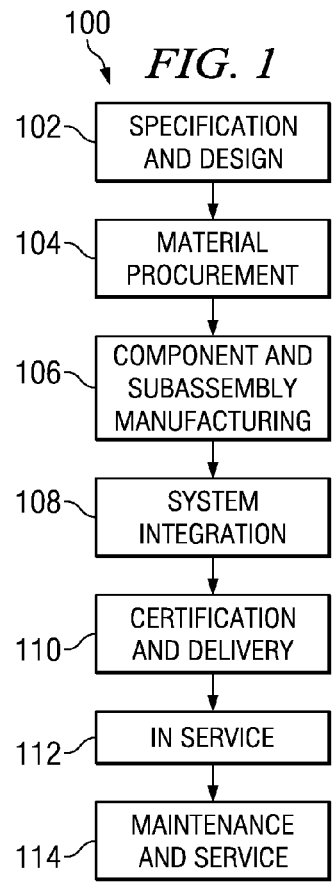
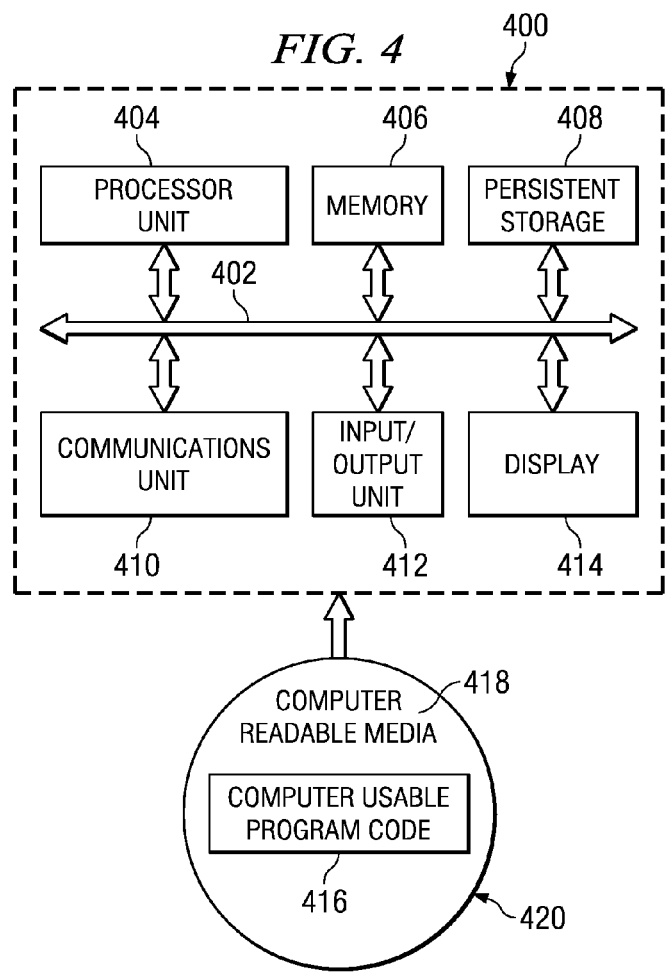
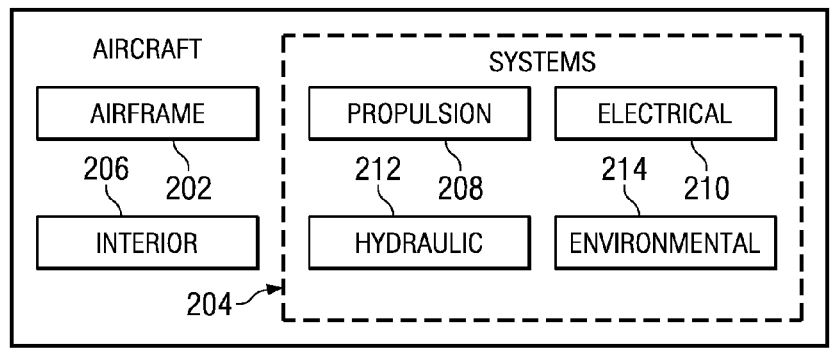

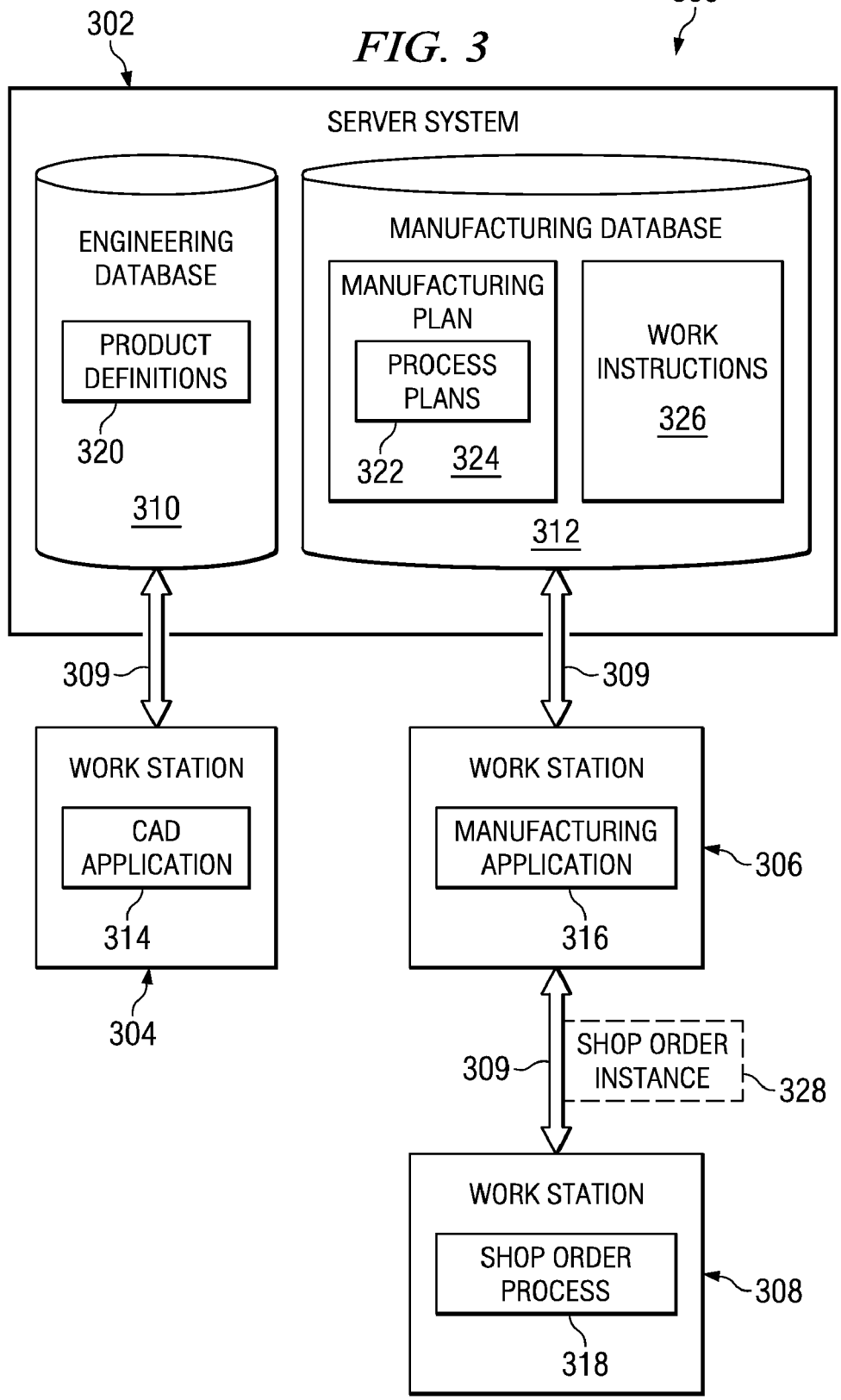

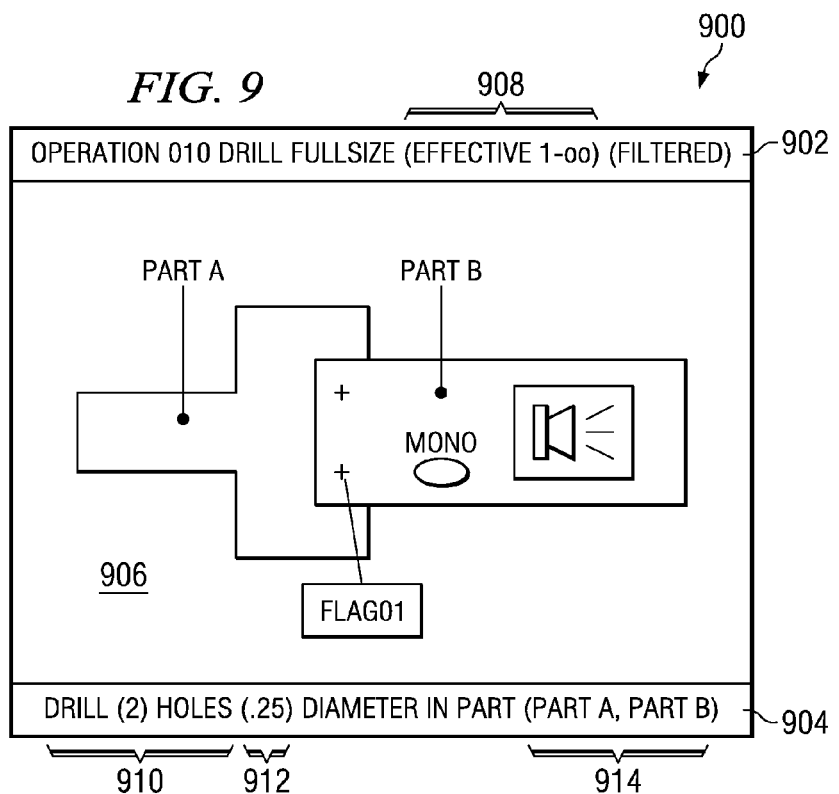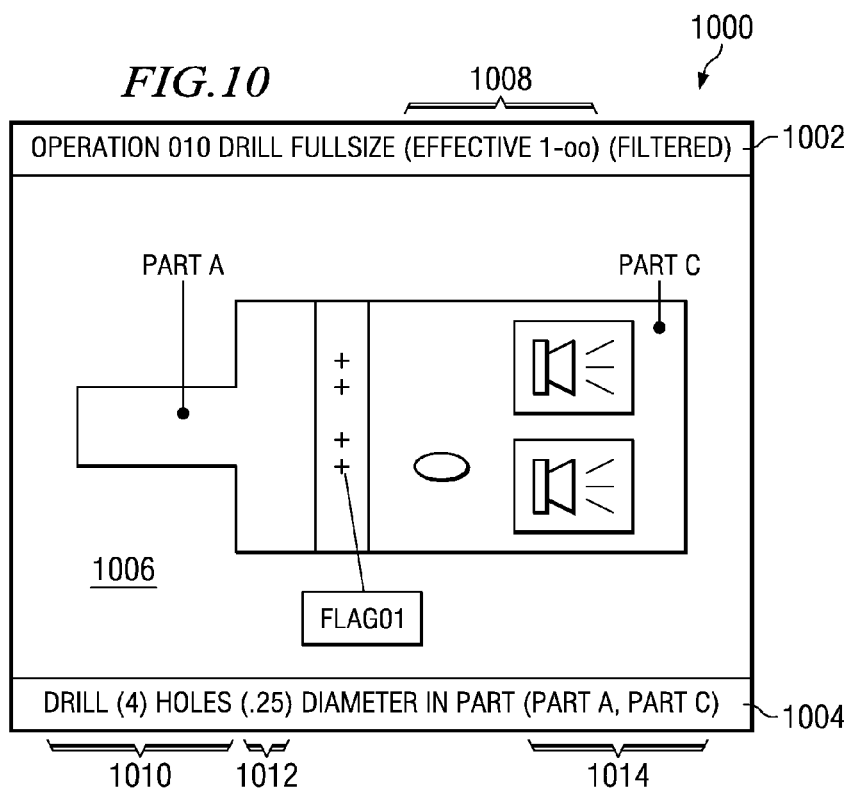

METHOD AND APPARATUS FOR WORK INSTRUCTION GENERATION

BACKGROUND INFORMATION

1. Field

The present disclosure relates generally to an improved data processing system and in particular to a method and apparatus for manufacturing products. Still more particularly, the present disclosure relates to a computer implemented method, apparatus, and computer usable program code for generating instructions to assemble products.

2. Background

A product may take various forms, such as, for example, a single part, a subassembly, or an entire product. As a non limiting example, the product may take the form of a wing subassembly, an engine, an audio input system, a wing spar, a flight control system, or an entire aircraft.

In designing and manufacturing products, a number of different processes may be present. Initially, an engineer or designer may generate product data for a product. This product information may include, for example, without limitation, bills of materials, attributes, requirements, and other information relating to the product. A computer aided design application may be used to create a drawing of the product with this product data. This drawing may take the form of a two dimensional drawing or a three dimensional drawing and/or model. The drawings may be used to form a model for the product. The product data may be combined or associated with the model to form a product definition.

With the product definition, process plans may be created to manufacture the product. These process plans also may include work instructions, which may be used to manufacture or assemble the product. The information in the product definition for the product and manufacturing processes for creating products may be used to create work instructions for the process plans to manufacture the product. A work instruction may provide an explanation for a step or operations that may be performed to manufacture a product. Each product or configuration of a product may have a set of work instructions. The selection of a particular product and configuration may result in the work instructions for selection being retrieved and presented for use in manufacturing the selected product or configuration of the product.

With the presence of many products with different configurations, management of the work instructions may become difficult. Currently, each configuration of a product may have a specific set of work instructions. One difficulty in managing work instructions may be the storage of the work instructions. As the number of work instructions increase, the amount of space needed to store these work instructions also may increase. This situation may not be of concern when only a few products may be manufactured by a business or organization. The concern, however, arises when hundreds or thousands of products are manufactured by a business or organization.

Another difficulty may occur in managing revisions or changes to the work instructions. If an organization or company has hundreds or thousands of products, storing and maintaining these work instructions may become difficult as with the addition of new products and changes to existing products.

When changes to a product occur, such as part changes or changes in requirements, the work instructions for the product and every configuration for that product may be updated. Currently, users maintaining work instructions may be required to look up the different documents for the instructions affected by a change and make those changes. Although the burden may be lightened by the fact that instructions are stored electronically, much time and effort may still be needed to update these instructions.

For example, if a product has five configurations, five sets of work instructions may be present. These work instructions may be used to define a step in the assembly of a particular configuration of the product. A particular hole size and process for deburring the hole also may be defined in each of these sets of instructions. If the hole size changes or if deburring is no longer required for the product, then each of the sets of instructions may be modified.

If changes affect hundred of products, then the time and maintenance needed to update work instructions for the products may increase. Further, changes may be made as customer requirements change during the lifetime of the product or changes occur to increase the efficiencies or reduce costs during manufacturing of the product. Updating work instructions may take into account changes, such as, for example, changes in desired configurations, changes to add or remove steps, or changes to revise product requirements in the work instruction content may often be a non-value added activity. In other words, the time and cost of these types of updates may not be chargeable or billable to customers.

Accordingly, there is a need for a method and apparatus for minimizing the burden and costs for maintaining work instructions, which over comes the problems discussed above. Embodiments of the disclosure are intended to satisfy this need.

SUMMARY

The advantageous embodiments of the present invention provide a computer implemented method, apparatus, and computer usable program code for manufacturing a product. In response to receiving an identification of the product, a process object associated with the product may be identified. A completed instance of the process object may be created for the product. A set of instructions may be presented to manufacture the product using the completed instance of the process object.

In another advantageous embodiment of the present invention, a computer program product contains a computer usable program code to identify a process object associated with the product in response to receiving an identification of the product. The computer usable program code is present to create a completed instance of the process object for the product. The computer usable program code may present a set of instructions to manufacture the product using the completed instance of the process object.

In yet another advantageous embodiment of the present invention, a data processing system executes a computer usable program to identify a process object associated with the product in response to receiving an identification of the product; create a completed instance of the process object for the product; and present a set of instructions to manufacture the product using the completed instance of the process object.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 1 is an illustration an aircraft manufacturing and service method in which an advantageous embodiment may be implemented;

FIG. 2 is an illustration of an aircraft in accordance with an advantageous embodiment;

FIG. 3 is an illustration of a production environment in accordance with an advantageous embodiment;

FIG. 4 is an illustration of a data processing system in accordance with an advantageous embodiment;

FIG. 9 is an illustration of a drill work instruction in accordance with an advantageous embodiment;

FIG. 10 is an illustration of a work instruction for a drill work instruction in accordance with an advantageous embodiment;

DETAILED DESCRIPTION

Figure 5:
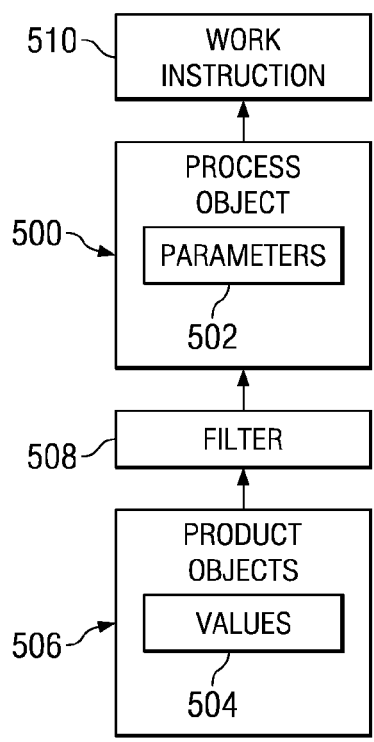
FIG. 5 is an illustration of components used to generate work instructions in accordance with an advantageous embodiment.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104. During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1. Also, one or more apparatus embodiments, method embodiments, or a combination thereof may be utilized during production stages, such as component and subassembly manufacturing 106 and system integration 108 in FIG. 1, for example, by substantially expediting the assembly of or reducing the cost of aircraft 200. Similarly, one or more of apparatus embodiments, method embodiments, or a combination thereof may be utilized while aircraft 200 is in service 112 in FIG. 1, for example and without limitation, to maintenance and service 114 in FIG. 1.

With reference now to FIG. 3, an illustration of a production environment is depicted in accordance with an advantageous embodiment. In this example, production environment 300 may be an example of a production environment that may be used in aircraft manufacturing and service method 100 in FIG. 1 to produce aircraft 200 in FIG. 2. Although these examples are directed towards the production of an aircraft, the different advantageous embodiments may be applied to producing any product. For example, without limitation, the different advantageous embodiments may be applied to other products, such as, without limitation, a car, a spacecraft, a submarine, a ship, a building, a dam, a power plant, furniture, or any assemblies or subassemblies of these types of products.

Production environment 300 may include server system 302, work station 304, work station 306 and work station 308. In these examples, these different hardware components may be in communication with each other through network 309. Network 309 may comprise physical communications links, such as, without limitation, wires and optical fibers. Additionally, network 309 also may include wireless communications links for providing communications between the different hardware components illustrated in production environment 300.

In this example, server system 302 may include one or more computers and provide access to engineering database 310 and manufacturing database 312. Work station 304 may execute computer aided design (CAD) application 314, work station 306 may execute manufacturing application 316, and work station 308 may execute shop order process 318.

In these examples, a user at work station 304 may operate computer aided design application 314 to create product definitions 320 within engineering database 310. A product definition within produce definitions 320 may include a two or three dimensional model of the product, as well as other information describing the product. A definition may be created using manufacturing requirements and data schema information. Other information that may be used in computer aided design application 314, to create a product definition, may include, for example, without limitation, a bill of materials, standard or non-standard attributes, and any other suitable data or information needed to create a product definition for product definitions 320.

A user at work station 304 may operate computer aided design application 314 to create a three dimensional model of a product. For example, computer aided design application 314 may be used to create three dimensional models of structural components, such as, without limitation, fuselage sections, bulkheads, frames, wing sections, random landing gear sections, crew platforms, lavatories, galleys, cockpits, and any other suitable components for an aircraft. These models and other information input into computer aided design application 314 may form product definitions 320 in engineering database 310.

After product definitions 320 have been created, a user operating manufacturing application 316, at work station 306, may import product definitions 320 into manufacturing database 312 to create process plans 322 to manufacture the products described by product definitions 320. In these examples, process plans 322 may include a set of processes. The set of processes may be one or more processes.

Process plans 322 may identify logical units of work that may be performed to create products as defined by product definitions 320. A logical unit of work may contain an identification of a product design and manufacturing requirements that may be formed by personnel in design and manufacturing operations. These personnel may include, for example, shop floor personnel who may perform a logical unit of work, which may be, such as, for example, without limitation, assembly or inspection tasks. A unit of work within process plans 322 may not produce a "product" for later assembly to complete another product. The subset of the product may be a particular component, such as, for example, without limitation, a fuselage, a spar, an aileron, a hydraulic system, an audio input jack, a switch, or any other set of components that may be grouped together for the unit of work.

A grouping of process plans 322 may form manufacturing plan 324 for the product. In these illustrative examples, the product may take the form of an aircraft. Further, the product may be a subassembly that may be sent to another manufacturer or other organization for assembly with other subassemblies. As another non-limiting example, the product also may take the form of an engine, an aileron, or a flight control unit.

An operator of manufacturing application 316 may use process plans 322 to create work instructions 326 for use in manufacturing a product. These work instructions may include instructions on performing processes within process plans 322 to create a product or to create components for a product defined using product definitions 320. In these depicted examples, a work instruction may correspond to a unit of work. For example, without limitation, a work instruction may provide for drilling a hole, aligning one component with another component, deburring a hole, or some other action.

The different components shown within production environment 300 are illustrated to depict one configuration in which the different advantageous embodiments may be implemented. This configuration is not intended to limit the architecture in which advantageous embodiments may be implemented. For example, engineering database 310 and manufacturing database 312 are shown as separate databases. Depending on the particular implementation, both of these databases may be implemented as a single database. Further, each database may be stored on the same server, computer, or in different servers and/or computers.

As another example, manufacturing application 316 and computer aided design application 314 are shown as being located on different work stations 304 and 306. In other embodiments, these applications may be located on the same workstation, such as, without limitation, workstation 304 and/or workstation 306. Further, access to these applications also may be provided through server system 302 such that work stations 304 and 306 may function only as terminals.

The different advantageous embodiments recognize that current approaches for creating work instructions may be based on the concept that all of the information to build a product may be contained within the work instructions. This level of information may include, for example, without limitation, diameter values, quantities of features, ceiling types, electrical bond class callouts, and other information needed to assemble a product.

The different embodiments, however, realize that this type of approach increases the cost and effort needed to maintain correct work instructions when changes occur. These changes may occur during the planning or during the life of the product. To avoid these and other maintenance problems, work instructions 326, in the different advantageous embodiments, may employ process objects. Each process object contains instructions with variables of parameters that may be filled in, depending on a particular requirement or configuration. Further, in these examples, each process object may encompass a set of logical units of work. The set of logical units of work may be one or more logical units of work.

For example, one configuration of a component may require three holes to be formed in a part, while another configuration of the same product may require four holes to be created in the part. The different advantageous embodiments may provide a template for work instructions in which the number of holes are a parameter, which may be filled in based on the selected configuration. In this manner, the work instruction may be required for each configuration that may be present. Further, if engineering changes or other changes occur that affect these types of parameters, those changes may be easily made without editing each individual work instruction, as may be currently required.

When manufacturing a particular instance of a product, a user operating manufacturing application 316 may generate shop order instance 328, which may be sent to shop order process 318 at work station 308. A user at work station 308 may operate shop order process 318 to view work instructions associated with shop order instance 328. In view of the work instructions, the user may perform work or may direct another person to perform work to assemble or produce the product that is subject to shop order instance 328.

In these examples, shop order instance 328 may include one or more work instructions from work instructions 326 for a particular product that is to be created. Shop order instance 328 may be, for example, for a product for assembly with other components to complete another product. For example, the product may be a subassembly for an aircraft. In other instances, shop order instance 328 may define a product for use in repairing an already existing product. One example of a product used to repair another product may be a flap to replace a damaged flap on an aircraft. In these illustrative embodiments, work station 308 may be located on a shop floor with shop order process 318 to present shop order instance 328.

Turning now to FIG. 4, a diagram of a data processing system is depicted in accordance with an illustrative embodiment. In this illustrative example, data processing system 400 includes communications fabric 402, which provides communications between processor unit 404, memory 406, persistent storage 408, communications unit 410, input/output (I/O) unit 412, and display 414. Data processing system 400 may be used to implement computers, such as those in server system 302, work station 304, work station 306, and work station 308 in FIG. 3.

Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406, in these examples, may be, for example, a random access memory. Persistent storage 408 may take various forms depending on the particular implementation. For example, persistent storage 408 may contain one or more components or devices. For example, without limitation, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard and mouse. Further, input/output unit 412 may send output to a printer. Display 414 provides a mechanism to display information to a user.

Instructions for the operating system and applications or programs are located on persistent storage 408. These instructions may be loaded into memory 406 for execution by processor unit 404. The processes of the different embodiments may be performed by processor unit 404 using computer implemented instructions, which may be located in a memory, such as memory 406. These instructions are referred to as computer usable program code or computer readable program code that may be read and executed by a processor in processor unit 404.

The computer readable program code may be embodied on different physical or tangible computer readable media, such as memory 406 or persistent storage 408.

Computer usable program code 416 is located in a functional form on computer readable media 418 and may be loaded onto or transferred to data processing system 400. Computer usable program code 416 and computer readable media 418 form computer program product 420 in these examples. In one example, computer readable media 418 may take the form of recordable media. For example, this type of media may be, for example, an optical or magnetic disc that is inserted or placed into a drive or other device that is part of persistent storage 408 for transfer onto a storage device, such as a hard drive that is part of persistent storage 408. Computer readable media 418 also may take the form of a persistent storage, such as a hard drive or a flash memory that is connected to data processing system 400.

Alternatively, computer usable program code 416 may be transferred to data processing system 400 from computer readable media 418 through a communications link to communications unit 410 and/or through a connection to input/output unit 412. The communications link and/or the connection may be physical or wireless in the illustrative examples. The computer readable media also may take the form of non-tangible media or transmission media, such as communications links or wireless transmissions containing the computer readable program code.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown.

For example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache such as found in an interface and memory controller hub that may be present in communications fabric 402.

The different advantageous embodiments may employ process objects in which each process object is a template that may be filled to generate a specific work instruction. These process objects may be for work instructions 326 in manufacturing database 312 in FIG. 3.

In the different advantageous embodiments, the process objects may be stored without values for reusability. A completed instance of a process object may be created when values are placed into the parameters in the process object. The creation of a completed instance of a process object may occur in response to an identification of a product. In these different advantageous embodiments, the identification of a product may be, for example, without limitation, a request by the manufacturer of the product, a request to review instruction of a product, or some other operation or request that may require viewing specific instructions for a product.

With reference next to FIG. 5, an illustration of components used to generate work instructions is depicted in accordance with an advantageous embodiment. In this depicted example, process object 500 may include parameters 502. These parameters may be filled with values 504 from product objects 506 using filter 508 to generate work instruction 510, which may be a specific instance of process object 500.

In these examples, process object 500 is an example of a process object that may be found in work instructions 326 in FIG. 3. Process object 500 may be a process or unit of work, such as, for example, without limitation, locate parts, drill holes, deburr holes, seal a part, put in fasteners, line components, or other processes that may be involved in manufacturing or assembling a product or an entire product. Parameters 502 may include, for example, without limitation, a quantity, a diameter, a type of mating, a type of chemical for cleaning, a type of sealant, a color, a product number for a component, a manufacturer, or other values that may be used to generate a specific instruction, such as work instruction 510.

Product objects 506 may be product objects within product definitions 320 in FIG. 3. Product objects 506 may contain values 504 for parameters 502 for a product defined in process plans 322 in FIG. 3. Non-limiting examples of values 504 that may be used to fill parameters 502 include, for example, a number of holes, a hole size, a type of sealant, a number of fasteners, an identification of a type of fastener, a part identifier, a number of parts, or some other value for parameters 502 that may be used to complete process object 500 to create a specific instance of a work instruction, such as work instruction 510.

Filter 508 may be used to identify data values from values 504 to fill parameters 502. In these examples, filter 508 may be created using Computer aided design application 314 and stored within product definitions 320 in FIG. 3. Filter 508 may be used by manufacturing application 316 in FIG. 3 to identify particular values and configurations from product definitions 320 in FIG. 3 or a product that has multiple options or configurations. Filter 508 may be used by manufacturing application 316 in FIG. 3 and may be used to select a particular product object from product objects 506 for a product that is to be manufactured.

Work instruction 510 may be a completed instance of process object 500 and may be an example of a work instruction that may be sent to a shop floor as part of shop order instance 328 in FIG. 3 for presentation at a work station, such as work station 308 using shop order process 318 in FIG. 3.

For example, process object 500 may be used for four different configurations of the same product. Different configurations may require, for example, without limitation, a different number of holes to be drilled in a particular part or specific parts that may be used for a particular configuration. In a non-limiting example, one configuration may use three parts and another configuration may use two parts.

Figure 6:
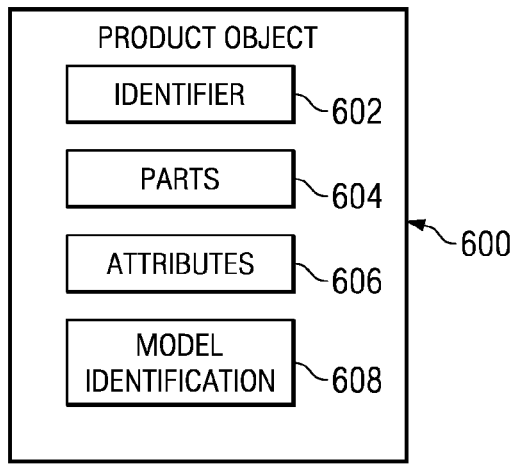
FIG. 6 is an illustration of a product object in accordance with an advantageous embodiment.

Turning now to FIG. 6, a diagram of product object 600 is depicted in accordance with an advantageous embodiment. Product object 600 is an example of a product object that may be found within product definitions 320 in engineering database 310 in FIG. 3. Product object 600 is an example of a product object within product objects 506 that is processed using filter 508 in FIG. 5.

In this example, product object 600 includes identifier 602, parts 604, attributes 606, and model identification 608. Identifier 602, part 604, attributes 606, and model identification 608 may be examples of values 504 in FIG. 5.

Identifier 602 may be a unique identifier used to distinguish product object 600 from other product objects in a database. Parts 604 include an identification of parts that may be assembled to form product object 600. Parts 604 may be one or more parts, depending on the particular product object. Attributes 606 identify information about the parts. For example, attributes 606 may identify a number of holes to be drilled, as well as the size of the holes.

Other non-limiting examples of attributes 606 may include, for example, without limitation, a type of fastener, whether a seal is to be used, a sealant type, an electrical bonding class, an electrical bonding type, whether to use a counter sink, counter bore definition, process specification callout, and other information that may include non-geometric requirements that describe a feature or set of features to be processed in manufacturing the product.

Model identification 608 may provide an identification of the drawing or model for the product. Model identification 608 may be a pointer to a two dimensional or three dimensional computer aided design drawing of the product. In these examples, the model identification may be a pointer to the location of the model. In other implementations, model identification 608 may be a unique identifier, or some other mechanism used to identify the model, rather than a location of the model.

Figure 7:
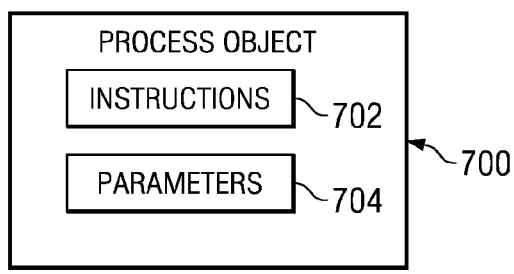
FIG. 7 is an illustration of a process object in accordance with an advantageous embodiment.

Turning now to FIG. 7, an illustration of process object 700 is depicted in accordance with an advantageous embodiment. In this example, process object 700 is an example of a process object present within work instructions 326 in FIG. 3. In particular, process object 700 may be an example of process object 500 in FIG. 5.

In this example, process object 700 includes instructions 702 and parameters 704. Instructions 702 may contain the text for process object 700. This text, in these examples, may be static. For example, the text may be directing a user to perform a drilling operation, a deburring operation, a cleaning operation, or some other operation used to assemble or manufacture the product.

Parameters 704 may be dispersed in various locations within instructions 702. Parameters 704 may identify information, such as number, size, part, or other information needed to correctly manufacture or assemble the object. These parameters may take the form of variables that may be filled in using a filter, such as filter 508 in FIG. 5.

Process object 700 may be a reusable object stored without values for parameters 704. When values are placed into parameters 704, process object 700 may become a completed instance of the process object. This specific instance of process object 700 may be sent for presentation or display in manufacturing a product. In these examples, values may be placed into parameters 704 when a request is made to manufacture or view instructions to manufacture a product.

With process object 700, an ability to create work instructions that are generated by the application of a filter may be present. In these different advantageous embodiments, process object 700 may not be directly active upon filter 508 in FIG. 5. In these different examples, filter 508 in FIG. 5 may be applied to product object 600 in FIG. 6 that may be associated with process object 700. In this manner, process object 700 may be applied to some or all configurations or products in which a particular operation is identified. Further, changes in the product definition in the product object, such as product object 600 in FIG. 6 may result in changes in the manner in which process object 700 is presented without requiring changes.

Figure 8:
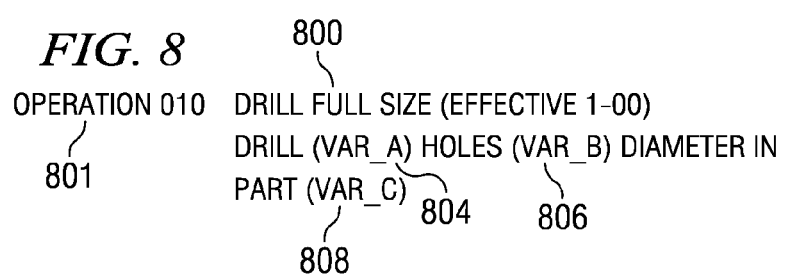
FIG. 8 is an illustration of instructions and parameters for a process object in accordance with an advantageous embodiment.

Turning now to FIG. 8, an illustration of instructions and parameters for process object 800 is depicted in accordance with an advantageous embodiment. Process object 800 may be a specific example of process object 700 in FIG. 7. In this example, process object 800 may include parameters, such as parameters 804, 806, and 808, embedded within instructions 801. Parameter 804 may represent the number of holes that may be drilled in the part or parts. Parameter 806 may represent the diameter of the holes, and parameter 808 may represent the parts that are to be drilled.

With reference now to FIG. 9, an illustration of a display of a drill work instruction is depicted in accordance with an advantageous embodiment. Display 900 displays a work instruction, which may be a specific instance of process object 800 in FIG. 8. In this example, display 900 may be a presentation of a work instruction for an audio jack.

In particular, display 900 may present instructions and three dimensional geometric representations of parts used to form an audio jack with a modern configuration. In this example, display 900 may display instructions in sections 902 and 904. A model corresponding to the product may be displayed in section 906. Instructions in sections 902 and 904 may be derived from process object 800 in FIG. 8.

In this example, the different parameters from instruction 801 in FIG. 8 may have been filled in with information from a product object that may be associated with this particular configuration of the product.

In this example, the effective date of the instruction may be found in section 908, the number of holes and the diameter of holes are found in sections 910 and 912. The identification of the parts may be in section 914. As can be seen, in this example, the different parameters may be filled with the specific information for the particular part.

Turning now to FIG. 10, an illustration of a work instruction for a drill work instruction is depicted in accordance with an advantageous embodiment. Display 1000 may present an instruction in the form of a specific instance of process object 800 in FIG. 8. In this example, display 1000 is an example of an instruction for an audio jack with a stereo configuration, in contrast to the configuration illustrated in display 900 in FIG. 9. In this example, display 1000 may contain an instruction in sections 1002 and 1004. A three dimensional geometric representation of the product may be found in section 1006.

In this example, the effective date or unit range of the instruction is found in section 1008. The number of holes is found is section 1010, and the size of the holes or diameter of the holes may be found in section 1012. The parts used in this configuration may be found in section 1014. As can be seen, display 1000 provides a different configuration, in which a different number of holes having the same diameter, but different parts, may be used as compared to the presentation of the instructions in display 900 in FIG. 9.

In this manner, configuration specific information may not be contained in the work instruction content in the different process objects. As a result, dynamic generation of work instructions for a particular configuration or a particular product may be accomplished.

Figure 11:
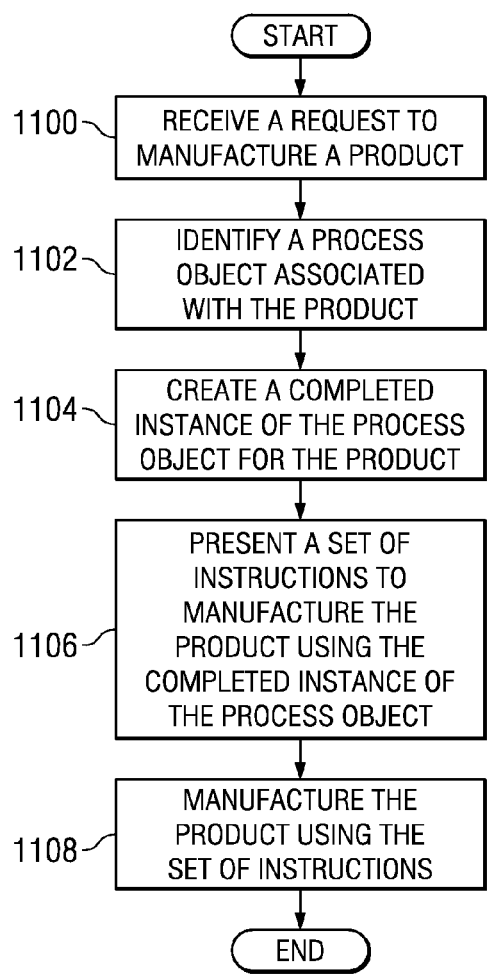
FIG. 11 is a flowchart of a process for manufacturing a product in accordance with an advantageous embodiment.

Turning now to FIG. 11, a flowchart of a process for manufacturing a product is depicted in accordance with an advantageous embodiment. The process illustrated in FIG. 11 may be implemented as part of a manufacturing process, such as component and subassembly manufacturing 106 or maintenance and service 114 in FIG. 1.

The process begins by receiving a request to manufacture a product (operation 1100). In this example, the request may include an identification of the product. Thereafter, a process object associated with the product may be identified (operation 1102). The process object may be identified through a process plan, including the process object for the particular product. For example, a process plan may identify processes that are to be performed to manufacture a specific product. These processes may be stored as process objects for use during the manufacturing process to generate instructions to manufacture the product.

Thereafter, a completed instance of the process object may be created for the product (operation 1104). In these examples, the creation of the completed instance of a process object may include placing values for parameters in the process object to make an instance of the process object that may be specific to manufacturing the product. These values may be identified from a product object associated with the identification of the product. Next, the process may present a set of instructions to manufacture the product using the completed instance of the processed object (operation 1106). The set of instructions may be one or more instructions. In operation 1106, the instructions may be presented on the display or may be printed as a hard copy, depending on the particular implementation.

The product may be manufactured using the set of instructions (operation 1108), with the process terminating thereafter. In operation 1108, a user may read the instructions and perform the directions set out in the instructions to manufacture the product. The work performed in FIG. 11 may be only part of a process for manufacturing the object. In manufacturing the object, additional work may be performed using additional instances of product objects for the product.

Figure 12:
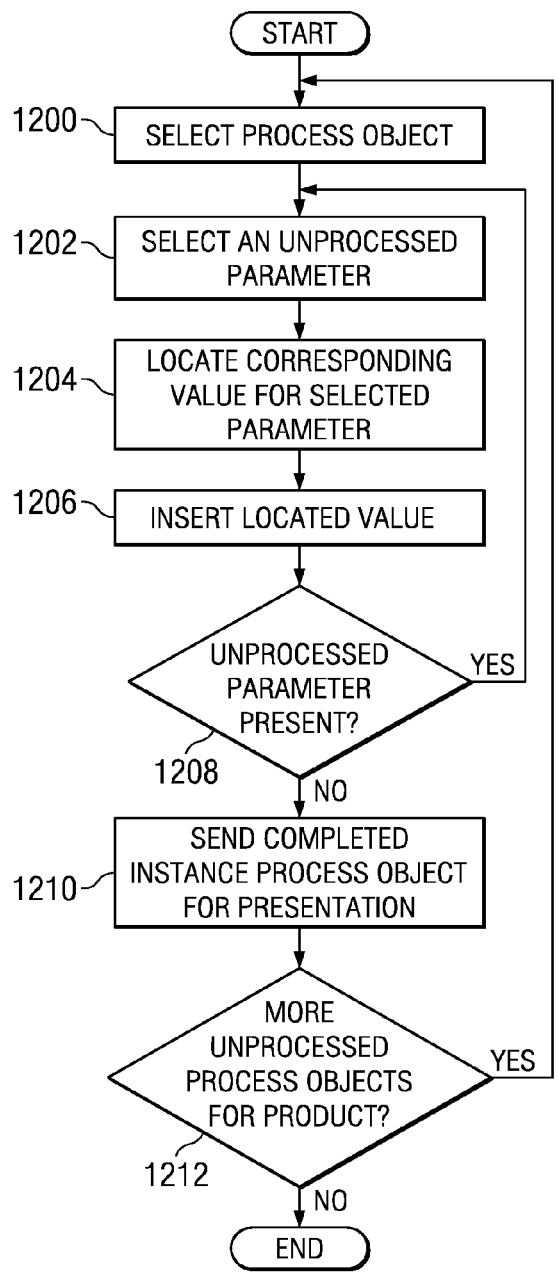
FIG. 12 is a flowchart of a process for generating a work instruction from a process object in accordance with an advantageous embodiment.

Turning now to FIG. 12, a flowchart of a process for generating a work instruction from a process object is depicted in accordance with an advantageous embodiment. The process illustrated in FIG. 12 may be implemented in a software component, such as manufacturing application 316 in FIG. 3. The process illustrated in FIG. 12 may be a more detailed explanation of operation 1104 in FIG. 11.

The process begins by selecting a process object (operation 1200). The process object selected in operation 1200 may be selected as a result of a request to initiate creation of a product. If more than one product object is present, the process plan may identify a sequence of process objects for initiation to manufacture the product. In this case, the selection of the process object in operation 1200 may be the next unprocessed process object.

Next, an unprocessed parameter may be selected (operation 1202). The unprocessed parameter may be a parameter within the selected process object that is being processed to create a work instruction. The parameter may be, for example, a number of holes, a hole size, or a part identification. The parameter also may identify, for example, without limitation, a paint color, a cleaning solution, an amount of cleaning time, an amount of cure time, or a cure temperature.

Thereafter, the corresponding value for the selected parameter may be located (operation 1204). In operation 1204, the corresponding value may be located within the identified product object. Next, the process may insert the located value for the parameter within the instance of the process object (operation 1206). A determination may be made as to whether additional unprocessed parameters may be present (operation 1208). If additional unprocessed parameters are present, the process returns to operation 1202.

Otherwise, the completed instance process object may be sent for presentation (operation 1210). Next, a determination may be made as to whether additional unprocessed process objects are present for the product (operation 1212). If additional unprocessed process objects are present for the product, the process returns to operation 1200 to select the next process object in sequence. The next process object may be processed to create a completed instance of the process object containing values specific to the product that has been selected or identified. Otherwise, the process terminates.

Depending on the implementation, multiple process objects may be present for manufacturing a product. For example, one process object may be used to drill holes in a part, while another process object may be used to insert fasteners for the product after the holes have been drilled.

Thus, the different advantageous embodiments provide a computer implemented method, apparatus, and computer usable program code for manufacturing a product. In response to receiving an identification of a product, a process object associated with the product may be identified. A completed instance of the process object may be created for the product. A set of instructions to manufacture the product may be presented using the completed instance of the process object.

In this manner, the different advantageous embodiments reduce the amount of time and effort needed to maintain updated work instructions. When product design changes are made, these changes may only be made within the product definition. The instructions for manufacturing a product may take the form of process objects, which may be filled using information from the product definition. As a result, only a single update is needed, rather than the current updating of both the product definition and the work instructions in the currently used methodologies.

In the illustrative embodiments, a completed instance of a process object may be created using a filter to identify values of information from product definitions. In these examples, a filter may be used to identify an appropriate product object within the product definitions for use in generating the specific instance of a process object. In this manner, reusable process objects are present. For example, a process object may be used again and again for multiple products, rather than being specific to a particular product. Further, the different advantageous embodiments also allow for the conclusion of three dimensional representations of the products and parts for the products.

In this manner, instructions may be dynamically generated whenever a request or identification of a product is made. As can be seen from the different advantageous embodiments described above, the process objects may be reusable to allow the creation of a completed instance of process object that contain specific instructions for a specific process. The process objects themselves may be reusable for many products. This type of reusable process object may remove the maintenance effort needed to implement design changes as compared with specific instances of instructions being stored for each product. Further, these different advantageous embodiments may reduce the number of process objects stored in a database, reducing the amount of needed storage space.

The different advantageous embodiments can take the form of an entirely hardware embodiment, an entirely software embodiment or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, or transport the program for use by or in connection with the instruction execution system, apparatus, or device.

The computer usable or computer readable medium can be, for example, without limitation an electronic, magnetic, optical, electromagnetic, infrared, or semiconductor system. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer implemented method for manufacturing a product, the method comprising:
   receiving an identification of the product to be manufactured;
   responsive to receiving the identification of the product to be manufactured, identifying a process object from a plurality of process objects associated with the product, wherein the process object comprises instructions, for a logical unit of work to be performed in manufacturing the product, and parameters;
   applying a filter to product objects, using a processor unit, to identify values for the product that correspond to the parameters, wherein each of the product objects is a product definition that is associated with the values for the parameters applicable to the product definition, and wherein the values include an identification of a three dimensional model of the product;
   replacing the parameters in the process object with the values to form a completed instance of the process object for the product; and
   presenting a set of manufacture instructions to manufacture the product comprising the instructions and values in the completed instance of the process object by displaying the set of manufacture instructions on a display device and simultaneously displaying the three dimensional model of the product on the display device.

2. The computer implemented method of claim 1, wherein the process object comprises the instructions for a logical unit of work selected from drilling a hole, aligning one component with another component, and deburring a hole.

3. The computer implemented method of claim 1, wherein the values for the product are in a product object.

4. The computer implemented method of claim 1, wherein the presenting step comprises:
   sending the set of manufacture instructions to at least one of a display device and a printer.

5. The computer implemented method of claim 1 further comprising:
   receiving the process object to form the identification of the product.

6. The computer implemented method of claim 1, further comprising:
   wherein the parameters are variables contained within the instructions, and wherein replacing the parameters in the process object with the values comprises replacing the variables with the values.

7. The method of claim 1, wherein the step of applying the filter is performed such that the values are identified among a plurality of configurations of the product to be manufactured.

8. A computer program product comprising:
a non-transitory computer readable storage medium having computer usable program code for manufacturing a product, the computer program product comprising:
computer usable program code for receiving an identification of the product to be manufactured;
computer usable program code for identifying a process object from a plurality of process objects associated with the product, wherein the process object comprises instructions for a logical unit of work to be performed in manufacturing the product and parameters, responsive to receiving an identification of the product to be manufactured;
computer usable program code for applying a filter to product objects, using a processor unit, to identify values for the product that correspond to the parameters, wherein each of the product objects is a product definition that is associated with the values for the parameters applicable to the product definition, and wherein the values include an identification of a three dimensional model of the product;
replacing the parameters in the process object with the values to form a completed instance of the process object for the product; and
computer usable program code for presenting a set of manufacture instructions to manufacture the product comprising the instructions and values in the completed instance of the process object by displaying the set of manufacture instructions on a display device and simultaneously displaying the three dimensional model of the product on the display device.

9. The computer program product of claim 8, wherein the values for the product are in a product object.

10. The computer program product of claim 8, wherein the parameters are variables contained within the instructions, and wherein replacing the parameters in the process object with the values comprises replacing the variables with the values.

11. The computer program product of claim 8, wherein the computer usable program code for applying the filter is configured such that the values are identified among a plurality of configurations of the product to be manufactured.

12. A data processing system comprising:
a bus;
a communications unit connected to the bus;
a storage device connected to the bus, wherein the storage device includes a computer usable program code; and
a processor unit connected to the bus, wherein the processor unit executes the computer usable program to perform steps comprising:
receiving an identification of the product to be manufactured;
responsive to receiving the identification of the product to be manufactured, identifying a process object from a plurality of process objects associated with the product, wherein the process object comprises instructions for a logical unit of work to be performed in manufacturing the product and parameters;
applying a filter to product objects, using a processor unit, to identify values for the product that correspond to the parameters, wherein each of the product objects is a product definition that is associated with the values for the parameters applicable to the product definition, and wherein the values include an identification of a three dimensional model of the product;
replacing the parameters in the process object with the values to form a completed instance of the process object for the product; and
presenting a set of manufacture instructions to manufacture the product comprising the instructions and values in the completed instance of the process object by displaying the set of manufacture instructions on a display device and simultaneously displaying the three dimensional model of the product on the display device.

13. The data processing system of claim 12, wherein the values for the product are in a product object.

14. The data processing system of claim 12, wherein the parameters are variables contained within the instructions, and wherein replacing the parameters in the process object with the values comprises replacing the variables with the values.

15. The data processing system of claim 12, wherein the processor unit executing the computer usable program code to apply the filter is performed such that the values are identified among a plurality of configurations of the product to be manufactured.

* * * * *